(No Model.)

C. H. RICHARDSON.
MEANS FOR REGULATING ELECTRIC MOTORS.

No. 501,961. Patented July 25, 1893.

WITNESSES:
Edw. F. Simpson Jr.
Jacob A. Behr.

INVENTOR
Chas. H. Richardson
By atty
J. S. Peyton

UNITED STATES PATENT OFFICE.

CHARLES H. RICHARDSON, OF PHILADELPHIA, PENNSYLVANIA, ASSIGNOR TO THE S. S. WHITE DENTAL MANUFACTURING COMPANY, OF SAME PLACE.

MEANS FOR REGULATING ELECTRIC MOTORS.

SPECIFICATION forming part of Letters Patent No. 501,961, dated July 25, 1893.

Application filed January 16, 1893. Serial No. 458,497. (No model.)

*To all whom it may concern:*

Be it known that I, CHARLES H. RICHARDSON, of the city and county of Philadelphia, in the State of Pennsylvania, have invented a certain new and useful Improvement in Means for Regulating Electric Motors, of which the following is a specification.

My invention relates to an improvement especially applicable to use in regulating electric motors for reducing speed and at the same time retaining the power or torque of the armature shaft at full or nearly full amount.

In an electric motor it is sometimes very desirable to obtain a speed much lower than the full speed and at the same time preserve as much as possible of the full amount of torque or pull on the armature shaft. It is well known that if this is attempted to be done by putting in resistance in series or shunt with the motor, the speed is reduced as resistance is added, but soon a point is reached where the torque or pull of the armature is rapidly reduced and this reduction in torque or pull eventually reaches a point where little work can be obtained from the motor.

It is known that there can be put a friction brake on the armature shaft, and thus slow it down either working directly on the main supply of current or with a resistance interposed; but this method produces the same back pull on the shaft or armature for each revolution thereof, whether the motor armature is running fast or slow and develops certain disadvantages when the motor is performing external work which will be explained farther on. An air fan, or fan blades immersed in some liquid could be placed on the armature shaft of the motor or connected mechanically to be revolved by it, and the fan or fan blades would reduce the speed of the motor armature, to a degree depending on their size and the angle at which they are set to the air or liquid. This method of regulation has the advantage, that as the speed is decreased by some external work below the point pre-determined by the fan resistance, the resistance (mechanical) of the fan blades rapidly decreases, in fact in a ratio somewhere near the square of the speed. Obviously the external work which is put upon the motor armature tends to reduce its speed below the point determined by the fan or fan blades and this extra reduction in speed tends to rapidly reduce the resistance (mechanical) of the fan or fan blades thus taking much less power to drive them than before, and this power saved from the fan is delivered to the external work, thus giving more power to it and keeping the speed more nearly constant at the pre-determined reduced speed than would be the case with a friction brake. In the friction brake the back pull per revolution is the same or nearly so at all speeds and on putting on extra external work no power is given up by the brake to the external work, which is the defect mentioned as requiring further explanation.

My object is to attain the same results as given by the fan or fan blades, by electrical means.

To attain the desired end by means under the control of the operator, I make the armature core of the motor in the usual laminated form, and wind on the usual coils connected in the usual way to an ordinary commutator; besides these I wind on the motor armature core an extra set of coils constituting generating coils electrically separate from the first set, and connected to their own commutator, which may be so arranged as to give either alternate or direct currents as desired. Provision is made for electrically connecting the brushes or collectors on the commutator of the extra or generating coils with a resistance capable of being varied and thus varying the speed below full speed, by putting more or less work on the motor. Instead of winding the extra or generating coils on the motor armature core, they can be wound on a separate core revolving in the same or another field and mechanically connected to and driven by the armature shaft of the motor whose rate of speed is to be varied. In this form of electrical speed reducer any extra reduction of speed due to external work, reduces the current in the extra or generating coils and their closed circuit through the resistance, thus taking less power for the speed reducer, which power is given to the the external work, and besides obtaining a strong pull on the motor shaft at slow speed the slow speed is maintained more nearly constant.

In the accompanying drawings which show suitable organizations for carrying out my invention in several equivalent ways, Figure 1 is a side elevation showing a form of apparatus in which the generating coils revolving in their own separate field are driven by a belt from the shaft of the motor whose speed is to be reduced. Fig. 2 is a view partly in plan and partly in horizontal section of a form of apparatus in which the generating coils revolve in their own separate field and are mounted rigidly on the elongated shaft of the motor armature. Fig. 3 is a view substantially similar to Fig. 2 except that the generating coils and the motor armature both rotate in the same magnetic field. Fig. 4 represents partly in plan and partly in horizontal section a form of apparatus in which the generating coils are wound upon the same core as the motor armature coils from which they are electrically separated. Fig. 5 is a view in end elevation of a portion of the apparatus shown by Fig. 4.

Referring now to Fig. 1, a suitable motor A is shown as provided with a pulley $a$ on the armature shaft from which passes a belt B to the external work to be done, such for instance as the actuation of a rotary dental tool. A second pulley $b$ on the motor armature shaft, actuates a belt C for driving a pulley $c$ on the armature shaft of a set of generating coils D. The motor armature and the generating coils armature revolve in their respective fields E E' when the motor is connected to the electrical source of supply. The generating coils are adapted to be put in or out of circuit with a variable resistance F of well known kind. The connection of this resistance with the generating coils is by means of brushes and a commutator G in obvious way.

In Fig. 2 the armatures of the motor coils and the generating coils are rigidly connected to a common shaft, and revolve in their separate fields E E'. The generating coils D are adapted to be connected with the resistance F as before.

Figure 1:
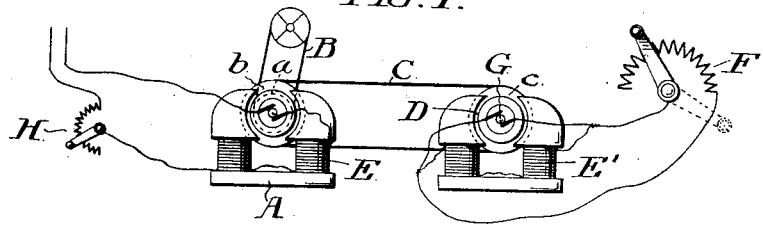
Figure 4:
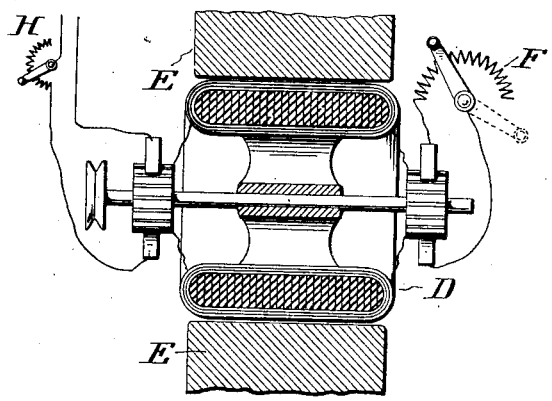
Figs. 4 and 5 show the motor coils, and the generating coils D all wound on one armature core, the two sets of coils revolving in the one field E, and the resistance being provided as before.
Figure 5:
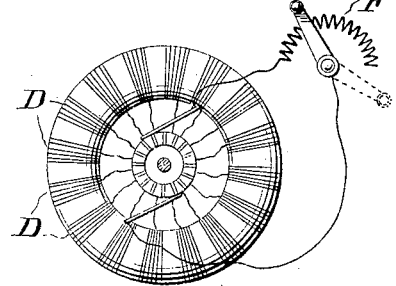
Figures 2, 3:
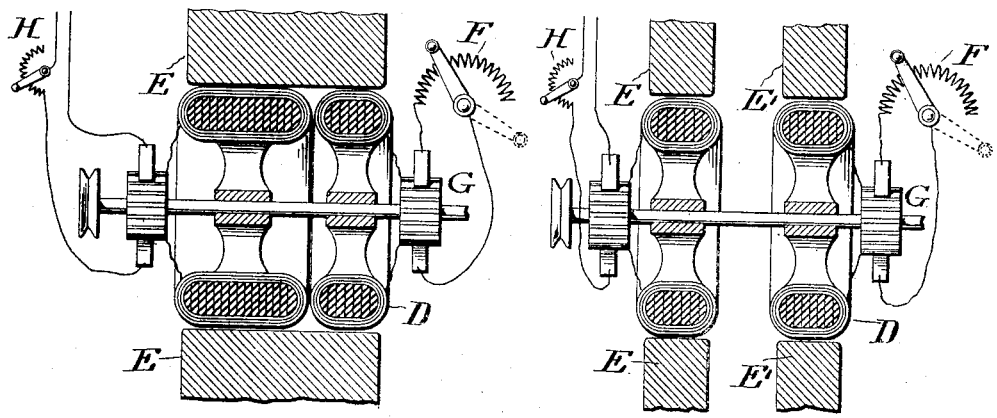
Figs. 3 shows, with one exception, substantially the same organization as Fig. 2, the exception being that both the motor armature and the generating coils armature revolve in the one field E.

In lieu of the employment of a belt connection between the armature shaft of the motor and the generating coils armature, toothed gearing may be employed in suitable way.

In operation the supply current is turned into the motor to give it the full speed. A suitable switch operated resistance H in the supply circuit may serve to produce the first reduction in speed. To still further reduce the speed of the motor, the variable resistance is thrown into electrical connection with the generating coils, and the result is that the electric current in the generating coils takes power from the motor and slows it down without reducing its pull or torque to any appreciable extent, while by this resistance speed may be reduced as desired, by increasing the amount of current produced in the generating coils. As will be obvious the counter electro-motive force in the motor is lessened in proportion to the reduction in speed, thus allowing more current to pass through the motor armature at slow speed than at high speed.

I claim as my invention—

The combination of an electric motor for doing external mechanical work, generating coils electrically separate from the motor armature and mechanically connected with and driven by the motor shaft, and a variable resistance in circuit with the generating coils, whereby provision is made for controlling the speed of the motor armature shaft while maintaining nearly constant the torque or pull thereon at any given speed determined by the adjustment of the resistance, substantially as set forth.

In testimony whereof I have hereunto subscribed my name.

CHARLES H. RICHARDSON.

Witnesses:
J. A. B. WILLIAMS,
ROBT. E. GORDON.